P. SCHMIDT.
CLOTHES LINE FASTENER.
APPLICATION FILED NOV. 23, 1910.
989,728.
Patented Apr. 18, 1911.
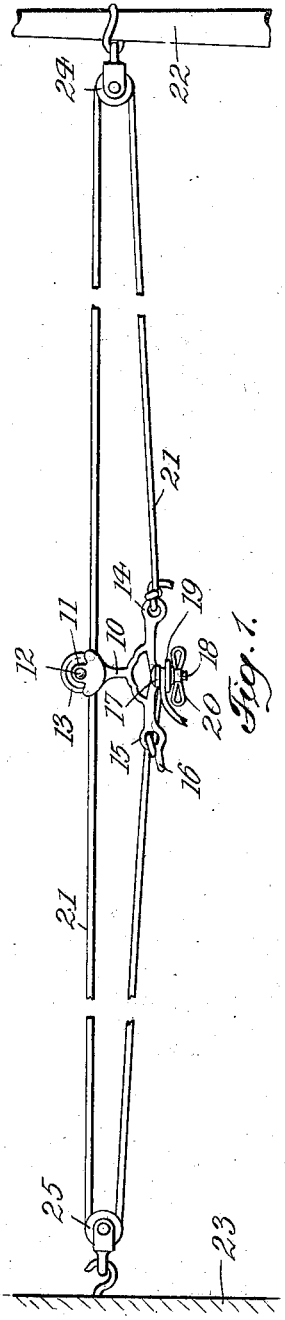
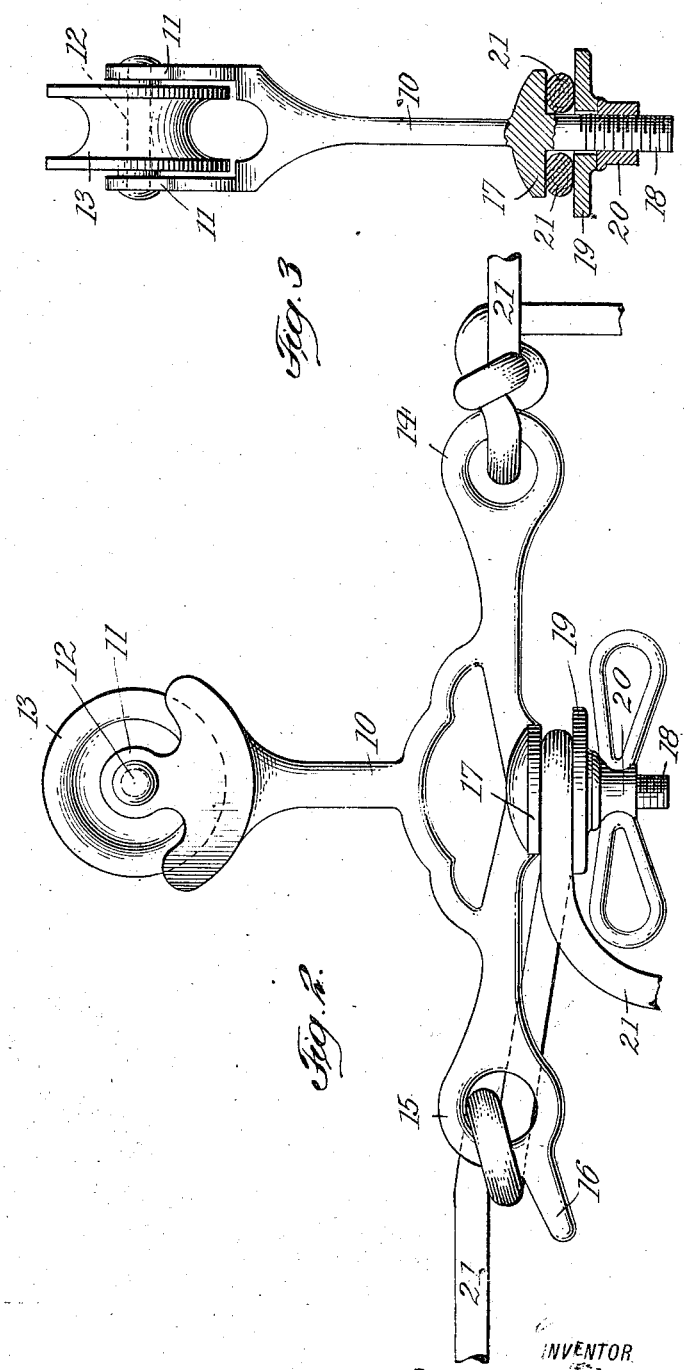

UNITED STATES PATENT OFFICE.

PETER SCHMIDT, OF STAMFORD, CONNECTICUT.

CLOTHES-LINE FASTENER.

989,728. Specification of Letters Patent. Patented Apr. 18, 1911.

Application filed November 23, 1910. Serial No. 593,775.

*To all whom it may concern:*

Be it known that I, PETER SCHMIDT, a citizen of the German Empire, residing at Stamford, in the county of Fairfield and State of Connecticut, have invented certain new and useful Improvements in Clothes-Line Fasteners, of which the following is a specification.

This invention relates to a clothes line fastener of novel construction which prevents the line from twisting, assists in distributing the weight, and permits any slackness to be readily taken up.

In the accompanying drawing: Figure 1 is a side elevation of my improved clothes line fastener showing it in use; Fig. 2 a side view of the fastener on a larger scale, and Fig. 3 a cross section partly in view thereof.

An inverted T-shaped trolley frame 10 is provided at the top of its upright arm with a pair of integral bearings or cheeks 11, in which is hung the axle 12 of an overhead trolley pulley 13. The two horizontal arms of frame 10 terminate in a pair of eyes 14, 15, one of said eyes, say eye 15 being provided with a finger or line rest 16 that extends longitudinally outward from the lower portion of such eye. At the bottom there is formed on frame 10, an integral central disk 17 constituting the relatively fixed member of a rope-clamp. From disk 17 depends a screw bolt 18 carrying a perforated washer 19, which constitutes the movable member of the clamp. A winged nut 20 engaging bolt 18 beneath the washer, permits the latter to be moved toward or away from disk 17.

In use the device is connected to a clothes line 21 by bringing pulley 13 into engagement with the upper run of such line. One end of the line—preferably the one nearest the yard pole 22—is then tied to eye 14. The other end of the line is passed over finger 16, wound once around eye 15 and is then clamped between the jaw members 17, 19. In this way the two ends of the line are connected to form the continuous lower run from which the wash is suspended. As the wash is being hung on the line between the house 23 and the fastener, the latter is gradually moved toward pole 22, by running the line in the usual manner through pulleys 24, 25. During this movement, and also during windy weather, the fastener serves to prevent the line from twisting, while it moreover assists in transferring the weight from the lower to the upper run. In case the line is to be slackened or tightened, nut 20 is manipulated to release the same and permit the proper adjustment to be effected.

It will be seen that when the line 21 carries the wash, it will bear with considerable weight against the loop interposed between the main body of the line and finger 16. In this way a friction brake will be formed that greatly relieves clamping device 17, 19, and checks an accidental release of the line by the latter when placed under heavy strain.

I claim:

A clothes line fastener comprising a trolley frame composed of an upright arm and two integral horizontal arms extending in opposite directions from said upright arm, an overhead pulley journaled in the upright arm, a line-clamping device at the lower side of the frame opposite the upright arm thereof, an eye formed on one of the horizontal arms to which the first end of a line may be permanently secured, and an eye and a finger extending outwardly and downwardly from said eye formed on the other end of the arm, so that the second end of the line may pass through said eye in the form of a loop that rests upon the finger and may then be secured to the holder by the line-clamping device.

PETER SCHMIDT.

Witnesses:
ALBERT PHILLIPS,
FANNIE E. WARDWELL.